United States Patent
Ito et al.

(10) Patent No.: US 7,421,618 B2
(45) Date of Patent: Sep. 2, 2008

(54) METHOD FOR PROCESSING A DIAGNOSIS OF A PROCESSOR, INFORMATION PROCESSING SYSTEM AND A DIAGNOSTIC PROCESSING PROGRAM

(75) Inventors: Masanao Ito, Hadano (JP); Tadayuki Sakakibara, Hadano (JP)

(73) Assignee: Hitachi, Ltd., Tokyo (JP)

( * ) Notice: Subject to any disclaimer, the term of this patent is extended or adjusted under 35 U.S.C. 154(b) by 460 days.

(21) Appl. No.: 11/017,942

(22) Filed: Dec. 22, 2004

(65) Prior Publication Data

US 2005/0166089 A1 Jul. 28, 2005

(30) Foreign Application Priority Data

Dec. 25, 2003 (JP) ............................. 2003-428629

(51) Int. Cl.
G06F 11/00 (2006.01)
(52) U.S. Cl. ...................................................... 714/27
(58) Field of Classification Search .................. 714/27, 714/31, 32, 38
See application file for complete search history.

(56) References Cited

U.S. PATENT DOCUMENTS

| | | | | |
|---|---|---|---|---|
| 5,675,731 A | * | 10/1997 | Fuller | 714/38 |
| 5,857,097 A | * | 1/1999 | Henzinger et al. | 712/236 |
| 6,009,514 A | * | 12/1999 | Henzinger et al. | 712/236 |
| 6,321,376 B1 | * | 11/2001 | Willis et al. | 717/124 |
| 6,360,333 B1 | * | 3/2002 | Jansen et al. | 714/25 |

FOREIGN PATENT DOCUMENTS

| | | |
|---|---|---|
| JP | 06-028328 | 2/1994 |
| JP | 06-083667 | 3/1994 |
| JP | 06/149612 | 5/1994 |
| JP | 10-003397 | 1/1998 |
| JP | 10-247185 | 9/1998 |

* cited by examiner

*Primary Examiner*—Nadeem Iqbal
(74) *Attorney, Agent, or Firm*—Antonelli, Terry, Stout & Kraus, LLP.

(57) ABSTRACT

In an information processing system including one or a plurality of processors, a diagnostic program is executed with a predetermined frequency to diagnose the processors. The diagnostic program generates one or a plurality of processes or threads at a predetermined frequency, at predetermined time intervals, for example, to diagnose the processors. A generated process or thread executes diagnosis on each processor, and the process or thread that detected a fault in the processor finishes its execution by storing fault information in storage. The process or thread of another processor other than the faulty processor refers to the fault information about the faulty processor and executes a troubleshooting process.

10 Claims, 6 Drawing Sheets

FIG.4A

DIAGNOSTIC CONTENTS SPECIFICATION INFORMATION

16a

| 20 | 21 | 22 | 23 |
|---|---|---|---|
| DIAGNOSTIC ITEM NO. | ITEM | OPERAND | TIME |
| 1 | FIXED-POINT ADDITION PATTERN 1 | A,B,C | 1 |
| 2 | FIXED-POINT ADDITION PATTERN 2 | A,B,C | 1 |
| 3 | FIXED-POINT SUBTRACTION PATTERN 1 | A,B,C | 1 |
| 4 | FIXED-POINT SUBTRACTION PATTERN 2 | A,B,C | 1 |
| 5 | FIXED-POINT MULTIPLICATION PATTERN 1 | A,B,C | 5 |
| 6 | FIXED-POINT MULTIPLICATION PATTERN 2 | A,B,C | 5 |
| 7 | FIXED-POINT DIVISION PATTERN 1 | A,B,C | 20 |
| 8 | FIXED-POINT DIVISION PATTERN 2 | A,B,C | 20 |
| 9 | FLOATING-POINT ADDITION PATTERN 1 | A,B,C | 3 |
| 10 | FLOATING-POINT ADDITION PATTERN 2 | A,B,C | 3 |
| 11 | FLOATING-POINT SUBTRACTION PATTERN 1 | A,B,C | 3 |
| 12 | FLOATING-POINT SUBTRACTION PATTERN 2 | A,B,C | 3 |
| 13 | FLOATING-POINT MULTIPLICATION PATTERN 1 | A,B,C | 3 |
| 14 | FLOATING-POINT MULTIPLICATION PATTERN 2 | A,B,C | 3 |
| 15 | FLOATING-POINT DIVISION PATTERN 1 | A,B,C | 15 |
| 16 | FLOATING-POINT DIVISION PATTERN 2 | A,B,C | 15 |
| 17 | FIXED-POINT COMPOSITE PATTERN 1 | A,B,C | 30 |
|  | ... |  |  |

| 1,2,3,4 |
|---|

DIAGNOSED STATE INFORMATION

| PROCESSOR 30 | STATE 31 | INFORMATION 32 |
|---|---|---|
| 1 | IN EXECUTION | DIAGNOSTIC ITEM NO. |
| 2 | FAULT | DIAGNOSTIC ITEM NO., FAULT CONTENT |
| 3 | EXECUTION COMPLETED | DIAGNOSTIC ITEM NO. |
| ... | | |

METHOD FOR PROCESSING A DIAGNOSIS OF A PROCESSOR, INFORMATION PROCESSING SYSTEM AND A DIAGNOSTIC PROCESSING PROGRAM

BACKGROUND OF THE INVENTION

The present invention relates to a diagnostic method for processors, which is capable of detecting faults in the processors as the component parts of the information processing system while the system is operating, and also relates to an information processing system and a diagnostic program for use with the diagnostic method. More particularly, the present invention concerns a diagnostic method which can decrease load on the system, which occurs when diagnosis is executed.

The improvement of reliability of the information processing system has been the important issue for a long time regardless of the scale and type of the system. The regions as the objects of reliability improvement are wide-ranging but, above all else, for the processor, which is the core of the system, various methods have been tried to improve the reliability, such as, by hardware or by software or by a combination of both.

Among the methods using hardware, there are a method which uses dedicated resources for reliability improvement provided in the processor and special-purpose microcodes as described in JP-A-6-28328, or another method which uses, besides the processor, hardware dedicated to reliability improvement as described in JP-A-10-247185, or a still other method in which resources, which require high reliability, are used in multiple configurations, and many other methods.

The methods which provide hardware are advantageous in that diagnosis can be executed in the background and that time required for diagnosis can be shortened, but they have a problem of increased cost. For this reason, in the cases where emphasis is placed on the performance of the whole system or on the cost performance rate, it may be difficult to adopt this kind of method. In such cases, the often adopted methods are a method in which diagnosis is executed only by software, or a method in which a minimum amount of hardware is added and then diagnosis is executed by software.

Among the methods to execute a diagnostic program for improvement of reliability, as disclosed in JP-A-6-149612 for example, there is a method which executes diagnosis by solely running a diagnostic program by using resources applicable to diagnosis by occupying or by almost constantly occupying them. Or, as disclosed in JP-A-6-83667, there is a method to execute a diagnostic program in parallel while an application is running.

SUMMARY OF THE INVENTION

When a diagnostic program is executed to improve reliability, it is desirable to cope with a performance deterioration of the system or another problem regarding the frequency of diagnosis. For example, even when diagnosis is performed by solely executing a diagnostic program, diagnosis should be executed while an application is running. Some kinds of application run continuously for a duration of a week or a month, it may happen that some application is running when diagnosis is required, and under this situation.

An object of the present invention is to provide a diagnostic method for executing diagnosis regardless of whether an application is running or not.

Another object of the present invention is to provide a diagnostic method which minimizes deterioration in the performance of an application while diagnosis is executed.

Yet another object of the present invention is to provide a diagnostic method which is capable of taking an appropriate recovery action when a fault occurs.

A still further object of the present invention is to provide an information processing system and a diagnostic program for executing the above-mentioned diagnostic methods.

According to the present invention, there is provided a method for performing diagnosis of an information processing system including one or a plurality of processors by using a diagnostic program, comprising the steps of:

setting a frequency of execution of diagnosis;

starting the diagnostic program to generate processes or threads for diagnosing the information processing system at said frequency; and executing specified diagnosis on each of said processors by using said process or thread generated. A program for diagnosing a fault in a processor can be executed under control of OS (Operating System) as when ordinary applications are executed. The diagnostic program, when it runs, refers to data on the frequency of execution and limits its own execution time. More specifically, pause periods of not executing diagnosis are provided, during which the pause process is performed, to thereby reduce load on the system to nil. As the frequency of execution, an interval between executions of diagnosis and a time required to execute one diagnosis are recorded. For example, by setting a time for one diagnosis to not more than 0.1 s and an interval between diagnoses to 100 s, the diagnostic program executes diagnosis for a duration of 0.1 s every 100 s, so that the load on the system can be reduced to not more than 0.1% on the average.

The diagnostic program produces forks (duplicates) of itself as many as the number of processors present in the system at the time of diagnosis execution, and the reproduced diagnostic programs are executed on the respective processors of the system to diagnose those processors. As just described, ordinarily, there are no programs for diagnosis in the processors and forks are produced only when necessary, for which reason, the consumption of resources in the system is suppressed, so that the load on the system can be decreased. The above-mentioned forks may be called "copies" or "duplicates."

If a diagnostic result shows that a fault occurred, information about occurrence of the fault is recorded and the diagnostic program on the processor stops running. The adjacent processors to the faulty processor, after terminating the diagnostic process on themselves, refer to information about occurrence of the fault and check to see if any fault occurred in the other adjacent processor. If a fault is detected, the normal processor takes actions to make the faulty processor recover from the fault.

By having a normal processor execute a process upon occurrence of a fault on behalf of the faulty processor, it is possible to execute a troubleshooting process with high reliability. It is possible to select a troubleshooting method in response to an instruction from the user. For example, only the faulty processors can be cut off from the system to make the other processors continue processing or the whole system can be stopped.

BRIEF DESCRIPTION OF THE DRAWINGS

FIG. 4A is a diagram showing a concrete example of information for specifying diagnosis contents of FIG. 3;

FIG. 4B is a diagram showing a concrete example of information for specifying diagnosis contents of FIG. 3;

DETAILED DESCRIPTION OF THE EMBODIMENTS

Embodiments of the present invention will be described in detail with reference to the accompanying drawings.

Figure 1:
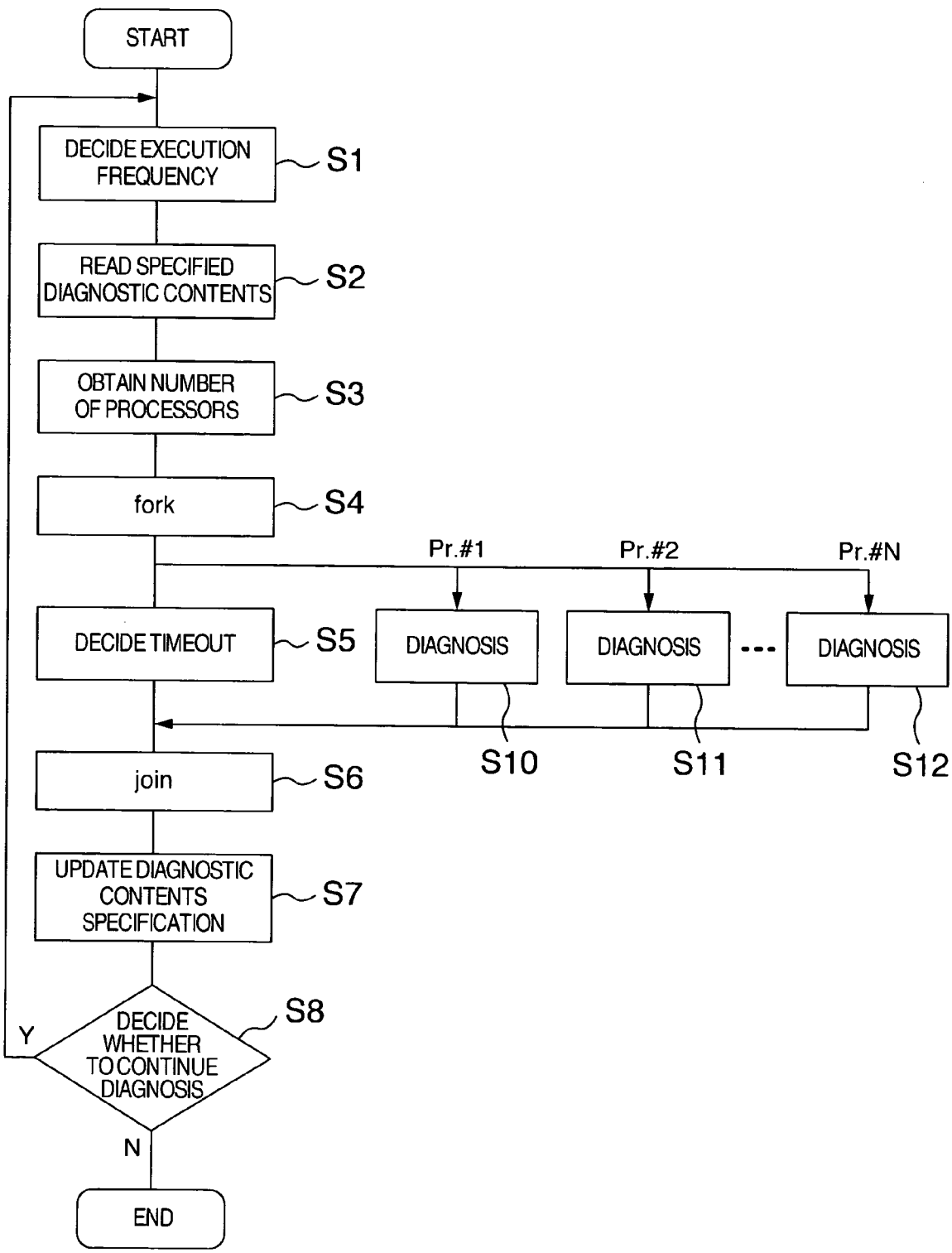
FIG. 1 is a flowchart showing the operation of a diagnostic program according to an embodiment of the present invention.
Figure 2:
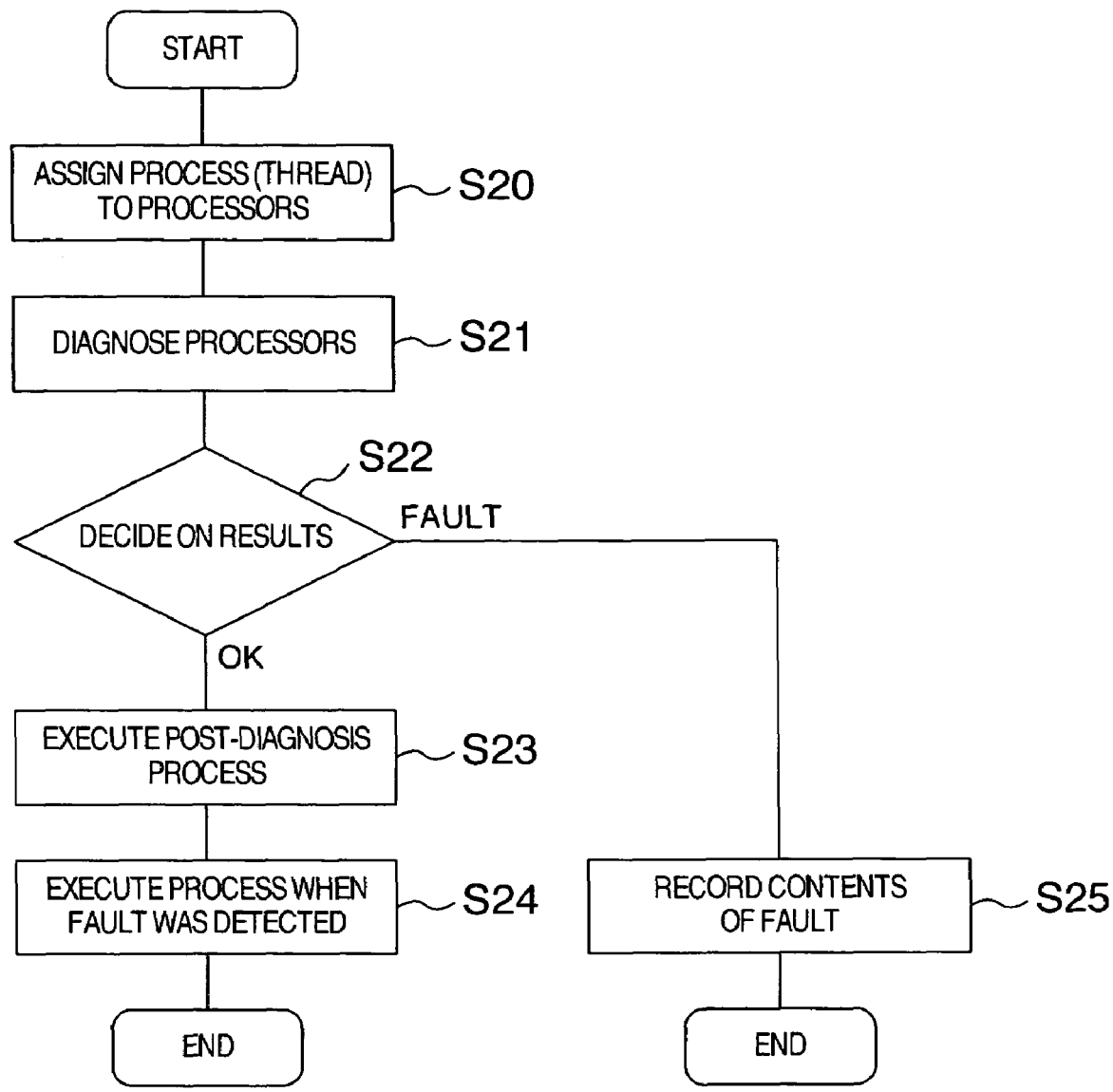
FIG. 2 is a flowchart showing the operation of a diagnostic program according to an embodiment of the present invention.
Figure 3:
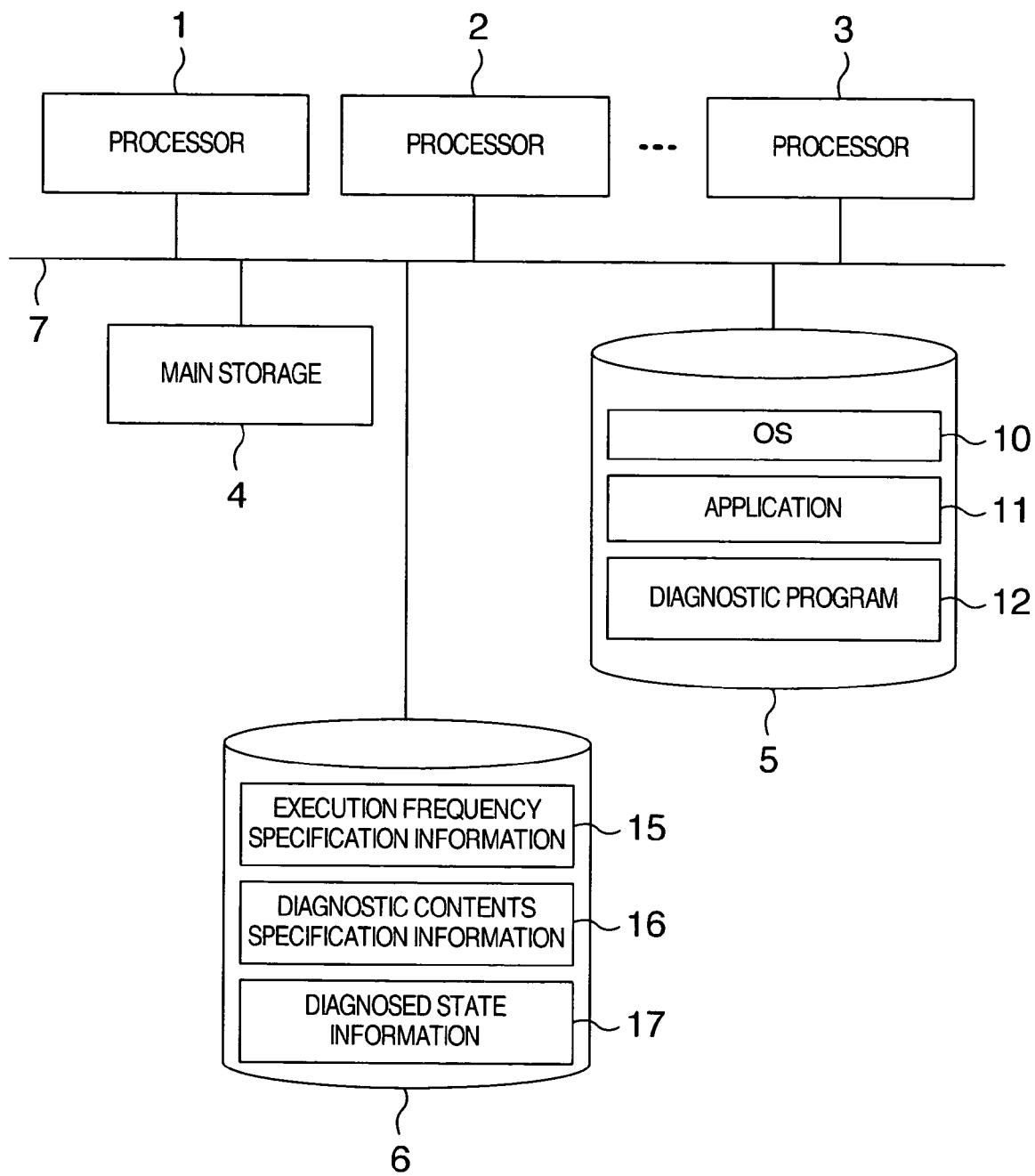
FIG. 3 is a block diagram of an information processing system in which the diagnostic program according to the embodiment of the present invention is executed.

Referring to the drawings, in FIGS. 1 and 2, reference numerals S1 to S25 denote process steps, and in FIG. 3, 1 to 3 denote processors, 4 denotes main storage unit, 5 and 6 denote external storage devices, 7 denotes a bus, 10 denotes OS (Operating System), 11 denotes an application, and 12 denotes a diagnostic program.

In FIG. 3, though there are the processors 1 to 3, the number of processors may one, or if a plurality of processors are provided, the number may be any number. In FIG. 3, the processors 1 to 3 are connected through the bus 7 to the main storage unit 4 and the external storage devices 5 and 6, but connections are not limited to these routes. For example, a main storage control unit may intervene between the processors 1 to 3 and the main storage unit 4. Similarly, another control unit may be located between the processors 1 to 3 and the external storage devices 5 and 6. The same applies to connections between the main storage unit 4 and the external storage devices 5 and 6. In FIG. 3, there are two external storage devices 5 and 6, the number of the external storage devices may be one or three or more.

When the system is started, OS10 stored in the external storage device 5 is read out and executed by the processors 1 to 3, making the system operational. When OS10 has been started, the user can, when necessary, execute an application 11 stored in the external storage device 5. While the OS10 is under operation, in its starting process, the diagnostic program 12 stored in the external storage device 5 is started. As the diagnostic program 12 is executed, the processors are diagnosed, which is the object of the present invention, to see if any fault occurred. To start the diagnostic program 12 when OS10 is under operation, a standard function provided in OS10 is used. In the case of UNIX, for example, by adding a line to specify the start of the diagnostic program 12 to a file called etc/inittab, the objective to start the program can be achieved. (UNIX is a registered trademark in the United States and other countries, exclusively licensed through X/Open Company Limited). At this time, even if the diagnostic program is under operation, the user can execute an application 11 at the same time. Because the diagnostic program 12 is one of programs that run on OS10, the execution of the diagnostic program 12 does not impede the execution of other programs.

Details of diagnosis to detect faults in the processors will be described with reference to FIGS. 1 to 3. When the diagnostic program 12 is started by OS10, the diagnostic program 12 is executed by a procedure shown in FIG. 1. As a processor on which the diagnostic program 12 is executed, an arbitrary processor which can be operated by OS10 is selected by a standard function of OS10. According to a process step S1, a frequency of execution is decided. Since the diagnostic program 12 is one of programs executed on OS10, when the diagnostic program 12 is executed, this execution affects the performance of other programs (an application 11 for example). To minimize this influence, an execution frequency is decided. The execution frequency specification information 15 is stored in the external storage device 6. The execution frequency specification information 15 holds a time interval between executions of the diagnostic program. The execution frequency specification information 15 can further hold the amount of execution of one diagnostic, that is, a length of time of execution, for example. As described earlier, the execution frequency specification information 15 holds 100 s as the interval between executions of diagnosis and less than 0.1 s as the time for one diagnosis. Note that though the execution frequency specification information 15 is stored in the external storage device 6 in FIG. 3, it may be stored in the main storage unit 4 or in the external storage device 5 or in any other storage device.

At the process S1, the diagnostic program 12 refers to the time interval, and waits until a fixed time elapses from the time of the last diagnosis or puts the diagnostic program 12 in a pause state, by which it becomes possible to execute another program (an application 11 for example) without decreasing the performance in the system. As means to put a pause state into effect, a standard function provided in OS10 is used. For example, in the case of UNIX, by executing a sleep function, it is possible to achieve the same objective. With regard to a time when to put the diagnostic program 12 in a pause state, it's a fixed value of a set time interval as described above, but means to set a time interval may be provided so that the user can set it. After the pause state is terminated and when diagnosis is started, the time is recorded anew in the execution frequency specification information 15.

After the process step S1, the process step S2 is executed, in which diagnostic items for diagnosing processor faults are selected. As described later, the diagnostic program 12 records information about diagnostic items of the last diagnosis in the diagnostic contents specification information 16 in the external storage device 6. Note that though the diagnostic contents specification information 16 is located in the external storage device 6 in FIG. 3, this information may be stored in the main storage unit 4 or the external storage device 5, or in any other storage device.

The diagnostic program 12 refers to the diagnostic contents specification information 16 in the process step S2, and decides the contents of diagnosis this time. FIG. 4A and 4B show a concrete example of the diagnostic contents specification information 16. The diagnostic contents specification information 16 consists of a diagnostic items table 16a and a diagnostic items table 16b. The table 16a has fields 20 to 24, in which the field 20 shows the numbers assigned to the individual diagnostic contents, the field 21 shows the items of diagnostic contents, the field 22 shows the operands used in diagnosis, the field 23 shows the estimated values of time required for diagnosis. In FIG. 4A, the fields 20 and 21 are provided only for convenience in explanation of the present invention. In an actual program, if those fields are not provided as physical entities, there is no problem to the operation.

Respective entries in Tables in FIGS. 4A and 4B indicate the concrete contents of diagnosis. For example, an entry, the values of which is "1" in the diagnostic item field 20, means that it is diagnosed whether or not an addition is carried out correctly among fixed point arithmetic operations, and for this diagnosis, the operands shown in the field 22 are used. In other words, in actual diagnosis, each processor performs addition between the values of "A" and "B" shown in the field 22 and compares the sum with the value of "C". If two values are equal, the diagnostic result is correct and a decision is made that the processor is normal. If two values are not equal, a decision is made that a fault occurred in the processor, and a troubleshooting process is carried out (which will be described in detail later). The entry, the value of which is "3" in the diagnostic field 20, means that it is diagnosed whether or not a subtraction is performed correctly among fixed-point arithmetic operations, and for this diagnosis, the operands shown in the fields 22 are used. In other words, in actual diagnosis, each processor performs a subtraction between the values of "A" and "B" shown in the fields 22, and compares the difference with the value of "C". In FIG. 4A, the operands A, B and C are the same in the field 22 in each entry, but in actuality those values differ with different entries. In FIG. 4A, though only simple diagnostic items, such as addition, subtraction, multiplication and division, are shown, the diagnostic items may be more complicated contents.

Each time the content of each entry in the table of FIG. 4A is diagnosed, the value of the field 20 of an entry diagnosed is stored in the diagnostic contents specification information 16. For example, FIG. 4B shows that diagnostic item numbers 1 to 4 have been diagnosed up to the last diagnosis. However, as will be described later, if a plurality of diagnostic contents in the table 16*a* in FIG. 4A are diagnosed all at once, the data in Table 16*b* may be updated at the same time.

Incidentally, in diagnosis discussed above, in a case where a decision is made that a processor is abnormal, the diagnostic content, at which abnormality was detected, may be diagnosed repeatedly a number of times. For example, a processing method may be arranged such that a basic number of times of repetition is set previously, and if abnormality only occurs less than a certain number of times, a report about a diagnosis result is only issued, but a troubleshooting process, which will be described later, is not executed.

In the manner as described, in the process step S2, the diagnostic program 12 refers to the diagnostic contents specification information 16, and updates the diagnostic contents according to the current diagnosis. The diagnostic program 12 can diagnose a plurality of entries in the table of FIG. 4A by one diagnosis. At this time, to decide how many items should be diagnosed at the same time, the values in the fields 23 are referred to. The fields 23 show the estimated values of time required for diagnosis, and by accumulating the estimated values of a plurality of entries, it is possible to know a total time required for diagnoses. In this embodiment, because the time for execution of one diagnosis is set to less than 0.1 s, the time for diagnosis execution is selected in a range of less than 0.1 s for the next and a plurality of subsequent diagnostic items after the last diagnostic item in the previous diagnosis shown in Table 16*b*. When all the diagnostic items have been executed, diagnostic items are to be selected again from the first item onward. In this embodiment, the value of the field 23 has been described as time, but the contents of the field 23 need not be time as long as it is possible to eventually obtain information about time required for execution of diagnosis. Since the time of execution of an instruction differs with the performance of the processor, the value of the field 23 may be converted into time according to the performance of the processor used. Or the number of instructions in diagnosis may be used for this purpose.

Though in this embodiment the time for one diagnosis is expressed in fixed values set as described, as in the time interval, setting means may be provided to enable the user to set. For example, information about load on the system during execution of diagnosis may be collected to increase or decrease the time for diagnosis execution according to numerical data obtained from this information. Supposing that a decision is made taking the execution frequency specification information 15 into account, if the interval between diagnoses by the diagnostic program is 100 s and the time for one diagnosis is 0.1 s, the load on the system by the diagnostic program 12 may be reduced to not more than 0.1% on the average. In the manner as described, in this embodiment, while the diagnostic program 12 is running, it is possible to control so that this causes little decrease in the performance of the user's executing program (an application 11 for example). Also, it is also possible to do such a setting as to preferentially execute the diagnostic program 12 when necessary.

After the process step S2, the process step S3 is executed. In the process step S3, the number of processors that can be used in the system is obtained.

After the process step S3, the process step S4 is executed. Duplicates of the diagnostic program 12 are produced as many as the number of processors obtained in step S4. This is because the diagnostic program 12 should be executed in all processors that can be used in the system. Incidentally, though in this embodiment description has been made on the assumption that all the processor that can be used in the system are diagnosed by the diagnostic program 12. Timing of diagnosis need not necessarily be simultaneous in the respective processors. For example, it is possible to make such an arrangement that only one processor is diagnosed at a time and the processors are diagnosed from one unit after another.

Duplicates of the diagnostic program 12 are produced by using a standard function provided in OS10. For example, in the case of UNIX, a system function may be used, and processes may be produced for each processor by using a fork function. Without generating a process for each of the processors, it is possible to execute a plurality of threads generated in a single process. For example, in the case of a system based on POSIX (Portable Operating System Interface for UNIX), by executing a pthread_create function, it is possible to achieve the same objective.

By the above-mentioned duplicate, a process or a thread shown in steps S10 to S12 are generated. Steps S10 to S12 are executed on different processors as described later, but their operation contents are the same. The operations in steps S10 to S12 will be described with reference to FIG. 2.

Firstly, the process step S20 is executed. In step S2, to execute the process step S S10 to S12 on each processor in the system, a bind process is performed. For example, the bind process is performed in order that the process step S10 is executed on the processor 1, the process step S11 is executed on the processor 2, and the process step S12 is executed on the processor 3. The bind process is applied by using a standard function provided in OS10. For example, by pbind in the case of Solaris (a trademark of Sun Microsystems, Inc. of US), by psrset in the case of HP-UX (a trademark of Hewlett-Packard company), and by bindprocessor in the case of AIX (a trademark of International Business Machines Corp.), it is possible to achieve the same objective.

In the execution on each processor, the diagnostic program may be loaded from the external storage to each processor or only part of it may be loaded while the diagnostic program is left in the external storage.

After the process step S20, the process step S21 is executed. In the process step S21, a specific diagnosis is performed on each processor. As for the items of diagnosis, they have been described with reference to FIGS. 4A and 4B.

Diagnosis is carried out on the diagnostic contents shown in the diagnostic contents specification information 16.

After the process step S21, the process step S22 is executed. In the process step S22, from a diagnostic result, a decision is made whether or not there is a fault. When diagnosis is performed to check a plurality of diagnostic contents, a plurality of step S21 may be performed collectively, and then the corresponding number of step S22 may be carried out collectively. Or otherwise, in each diagnosis, each execution of the process step S21 may be followed by the execution of the process step S22, and this operation may be repeated. In each individual diagnosis, the state as diagnosed is stored in the diagnosed state information 17. Though FIG. 3 shows that the diagnosed state information 17 is stored in the external storage device 6, the information 17 may be stored in the main storage unit 4 or in the external storage device 5, or in any other storage device.

Figures 5, 6:
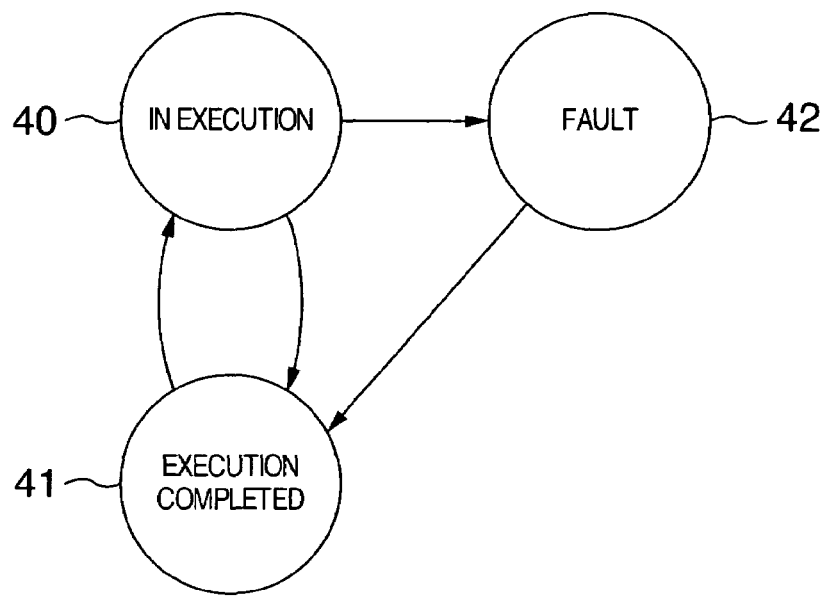
FIG. 5 is a diagram showing information about states of diagnosis.
FIG. 6 is a state transition diagram of the information about states of diagnosis.

Information stored in the diagnosed state information 17 will be described with reference to FIG. 5. FIG. 5 is a table showing the contents stored in the diagnosed state information 17. Reference numerals 30 to 32 in the table denote fields. The fields 30 indicate the processors to which the diagnosed states belong, the fields 31 indicate the states as results of diagnoses executed, and the fields 32 indicate other items of information related to diagnosis. The diagnosed state information 17 shows entries as many as the number of processor.

Each time a decision is made about the result of diagnosis in step S22, the content of the diagnosed state information 17 is updated at an entry in conjunction with the processor made the decision. Firstly, in the process step S20, a state "Under execution" is stored in the field 31. Each time diagnosis is executed, a diagnostic item number (the value in the field 20 shown in FIG. 4) is stored in the field 32. With regard to the diagnostic contents of one diagnosis, if all the contents are normal, "Execution completed" is stored in the field 31, and the routine proceeds to step S23. In the process step S23, log information on diagnosis this time is recorded and the diagnostic contents specification information 16 is updated.

When a fault is detected in the process step S22, the routine proceeds to step S25. At an entry, which corresponds to its own processor, in the diagnosed state information 17, a state "Fault" is stored in the field 31. A diagnostic item (a value in the field 20 in FIG. 4) of diagnosis which detected a fault and information about the fault are stored in the field 32. In the field of the information about fault, a value of a result of an arithmetic operation performed in diagnosis and additional information about the processor are stored. After these processes, the execution of the diagnostic program 12 is terminated in the processor where a fault occurred.

After a fault was detected, the diagnostic program 12 is not executed on the faulty processor. In other words, from this time on, when diagnosis is going to be executed, the contents of the diagnosed state information 17 are referred to in step S24, and on the processor whose field 31 shows the "Fault" state, the diagnostic program 12 is not executed. This will be described with reference to FIG. 6. FIG. 6 is a diagram showing the transition of the states shown in the field 31 in the diagnosed state information 17. In FIG. 6, reference numerals 40 to 42 denote the states.

At the start of diagnosis, in step S20, the state of the field 31 shifts to the state "Under execution" 40. If, at the start of the process step S20, the state is "Fault" 42, the state does not shift to "Under execution". After diagnosis is over, if the diagnosis result is normal, the state shifts to "Execution completed". Normally, the state shifts between "Under execution" and "Execution completed". When a fault is detected, the state becomes "Fault" 42, and while the diagnostic program is executing, the state stays at "Fault" 42.

After a fault was detected, and the faulty processor has been replaced, or even if the faulty processor is not replaced, when a fault reproduction test is performed on that processor, the state may be shifted from "Fault" 42 to "Execution completed" 41. A means for this shift is provided separately from the diagnostic program 12.

If a fault was detected, a subsequent troubleshooting process is executed by another processor, not by the processor where a fault occurred. A procedure for this purpose will be described in the following. In a processor where a fault did not occur, after the process step S23, step S24 is executed. In the process step S24, a process that follows after the occurrence of a fault is carried out by another processor. In the process step S24, the contents of the diagnosed state information 17 of other processors are referred to and the values of the fields 31 of other processors adjacent to the processor at issue are checked. If the state of the field 31 is "Execution completed", the process step S24 is closed without doing anything. If the state of the field 31 is "Fault", a troubleshooting process is executed for that processor. The content of the process executed at this time may be fixed or a means for selecting contents may be provided so that the user can select them. The troubleshooting process may be such that only the faulty processor is separated from the system and the process is continued on the remaining processors, for example, or the whole system may be shut down. Or, the faulty processor may be kept connected, and a warning is only issued to the user, and diagnosis of the system may be continued.

For example, it may be arranged that if there are two or more processors in the system, the processor, in which a fault occurred, is separated, and if there is only that processor in the system, the whole system is shut down.

As for the problem which processor should take necessary measures for the faulty processor, the adjacent processors need not necessarily perform this job. For example, in the case where two processors are mounted on the same LSI, it is likely that when a fault occurred in one processor, a fault occurred in the adjacent processor. In such a case, besides the adjacent-relations described above, pair-relations may be decided previously to specify which processor performs the troubleshooting process.

To cope with the case where faults occur simultaneously in a plurality of processors, in the same manner as above, pair-relations may be established in advance in order to specify which processor takes an assigned action. For example, it may be arranged that a method is established by which to check the adjacent processor for any fault when a fault is detected in one of the processors contiguous to each other.

In the present invention, when a fault occurs in the processors as described above, some other normal processor performs a troubleshooting process, there are high possibilities that necessary actions can be taken in proper working order when a fault occurs, thus providing the system with enhanced reliability.

Referring again to FIG. 1, in step S4, the process (or thread), which produced duplicates of the diagnostic program 12 in the process step S4, executes the process step S5. In the process step S5, with regard to the process step S S10 to S12 under execution at the respective processors, the diagnostic program 12 monitors times of diagnosis execution. As has been described, in the respective steps S10 to S12, a process is performed which ensures that the time for diagnosis execution is less than a predetermined time; however, it sometimes happens that the time for diagnosis execution of the diagnostic program is longer than an estimated time owing to the circumstances surrounding the system. Even in such a case, to ensure smaller load on the system, the diagnostic program 12 monitors the time of execution in the process step S5, and if a predetermined time is exceeded, the ongoing process among the process step S S10 to S12 is cut off halfway and terminated forcibly.

If the state "Fault" is found in the diagnosed state information 17 after forced termination, a bind process is executed such that a process or threads are bound to the processors which are free of faults. After this, a troubleshooting process is carried out in the manner as described above, after the process step S5 is finished, the routine proceeds to step 6.

The process step S5 also performs monitoring of the system. In some systems, the number of processors can be increased or decreased during operation. For example, there is a system which can use a single piece of original hardware as if it were a plurality of hardware obtained by virtually subdividing the original hardware and in which the processors can be reallocated among the plurality of hardware after the subdivision. In the process step S5, in the case where a request for a change in the number of processors is detected and the number of processors is changed, especially when the number of processors is reduced, a necessary process is performed. In other words, the diagnostic program 12 executing on the processor as the object of elimination is terminated forcibly in order to quickly meet the request to increase or decrease the processors in the system. If forced termination is not required in the process step S5, the routine proceeds directly to the process step S6. When the processors are increased in number, diagnosis is not executed this time, but the processors are assigned as objects of diagnosis for the next diagnosis.

In the process step S6, join is done or the program waits for the end of making duplicates of the diagnostic program 12. When all duplicates have been produced, the routine proceeds to step S7. In the process step S7, the diagnostic contents specification information 16 is updated. In other words, the completed diagnostic item table 16b of the diagnosis contents specification information 16 is updated with information about diagnostic items recorded in the fields 32 of the diagnosed state information 17. The table 16b is updated with diagnostic items which have been diagnosed in all processors with finished diagnostic items.

When forced termination is performed in the process step S5, it is highly likely that the contents in the fields 32 of the diagnosed state information 17 differ with different processors. In such a case, the table 16a is updated by using information about the processor at which the number of processes executed was smallest.

After the process step S7, a process step S8 is executed. In the process step S8, the diagnostic program 12 performs a self-check to see if any problem has arisen in itself. If any problem is detected, the diagnostic program 12 is terminated. If no problem is detected, the routine proceeds to the process step S1, and diagnosis of the system is continued.

In the foregoing, description has been made referring to the processors as the objects of diagnosis, but the present invention may be applied to other resources of the system, such as I/O resources like a PCI (Peripheral Component Interconnect) as the objects of diagnosis by using similar means as described above.

In such a case, in this embodiment, the diagnostic contents shown in FIG. 4 are changed to the contents suitable for the objects of diagnosis. Furthermore, when the process step S21 is executed, for the objects to be diagnosed, check is made to see if diagnosis on the diagnostic contents described above can be performed. This is because when I/O resources are diagnosed, for example, there is a possibility that those resources are under another process and all diagnostic contents cannot necessarily be diagnosed at a time when diagnosis is carried out.

By changing the diagnostic contents as described, the present invention can be applied directly to resources of the system other than the processors. Therefore, it becomes possible to detect faults in a wide range of resources of the system even when some application is running, which contributes to improvement of the reliability of the system.

When a fault occurs in the processor, it is possible that symptoms appear coming from trouble of the system and develop to "system down" before the diagnostic program 12 runs at a specified time interval and a fault is detected. Even if the diagnostic program 12 succeeds in detecting a fault, there are chances that the fault leads to "system down" before the fault is reported and action is taken.

In such a case, it is highly likely that the diagnostic contents, at which the fault was detected, or the neighboring diagnostic contents are stored in the diagnostic contents specification information 16. Accordingly, it is highly likely that a fault is detected again at the start of system operation by diagnosing the region which is contiguous to the doubtful diagnostic contents prescribed by the diagnostic contents specification information 16. This will surely improve the efficiency of fault detection.

In the process step S2 in the embodiment describe above, if diagnosis is executed just after the start of the diagnostic program 12, it is possible to arrange for diagnosis to be performed several times as many as that of ordinary diagnosis which will be one or a few times, on the diagnostic contents (of diagnostic item No. 7 for example) suggested by the diagnostic contents specification information 16 and the diagnostic contents of the previous item number (item No. 6).

According to this embodiment, even if measures taken after a fault occurred in the processor fail, it is easy to have the fault recur, making it possible to detect the cause of the fault, and construct a highly reliable system.

Description will now be made of another embodiment of the present invention. According to this embodiment, it is possible to execute the diagnostic program 12 with lesser load applied on the system than in the above-mentioned embodiment.

Figure 7:
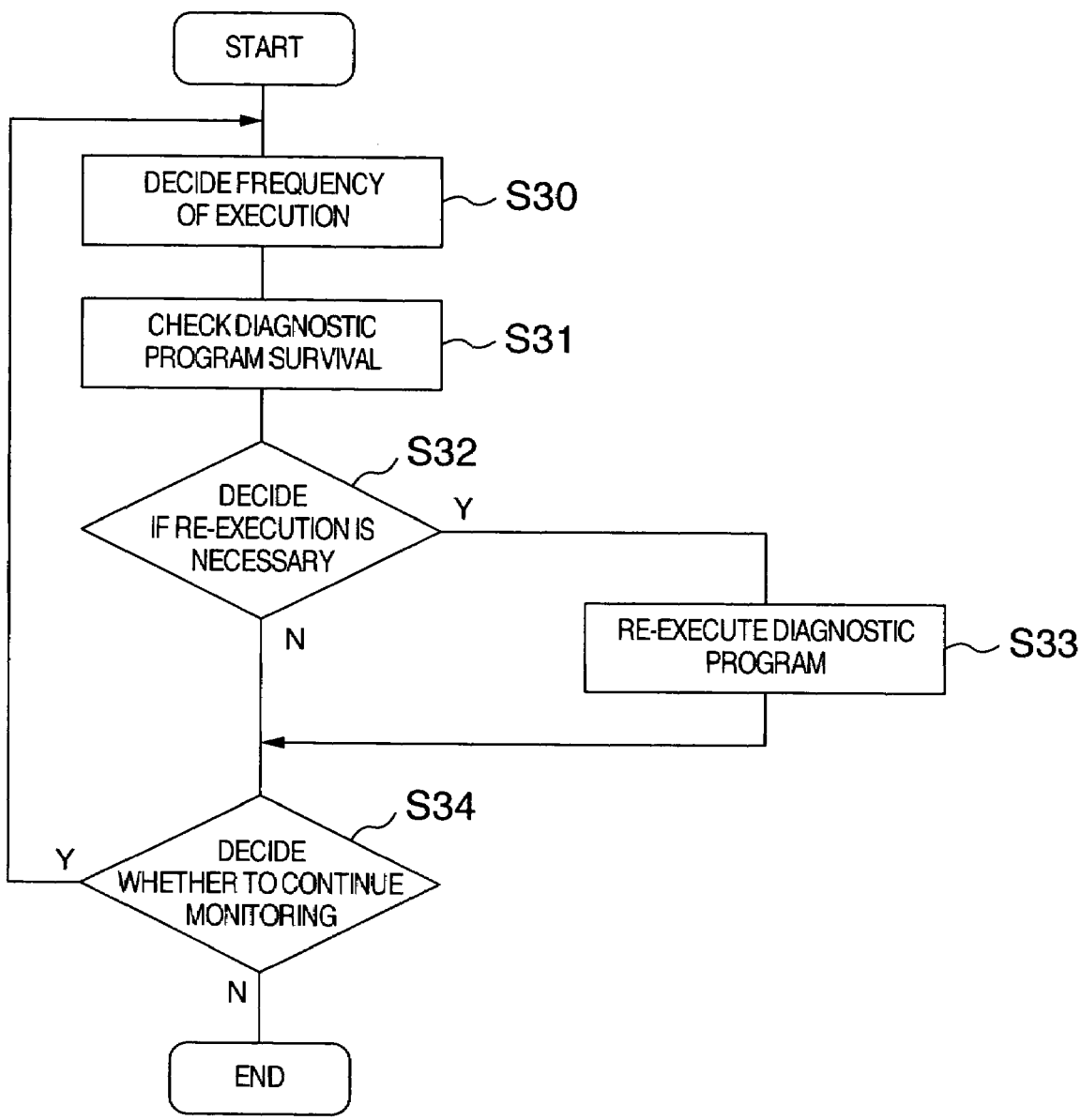
FIG. 7 is a flowchart showing the operation of a monitoring program according to another embodiment of the present invention.

FIG. 7 is a flowchart showing the operation of a program for monitoring the diagnostic program 12 described referring to the previous embodiment (hereafter referred to as a monitoring program).

Also in this other embodiment, the operation of the diagnostic program 12 is the same as in the previous embodiment except one thing that the diagnostic program 12 is started not from OS10 but from the monitoring program which will be described with reference to FIG. 7.

Like in the diagnostic program 12, the monitoring program is stored in the external storage device 5 of the system and is executing on the system shown in FIG. 3. The monitoring program is started by OS10 while OS10 is operating. The starting method is the same as that of the diagnostic program 12 in the previous embodiment. The operation of the monitoring program after it is started will be described in detail with reference to FIG. 7. When the monitoring program is started by OS10, and is executed by process steps shown in FIG. 7. The frequency of execution is decided according to a process step S30. The operating means and the objective of the process step S30 are the same as in the process step S1 in the above-mentioned embodiment. In other words, the process step S30 is executed in order that the execution of the monitoring program does not apply load to the system.

After the process step S30, the process step S31 is executed. The process step S31 checks the working condition of the diagnostic program 12. The process step S31 confirms whether the diagnostic program 12 finished running because some problem occurred in the system or because there is another problem in the diagnostic program itself. Simultaneously, the process step S31 checks if an event occurred that a plurality of diagnostic programs 12 were started concurrently due to some abnormality in control.

After the above checks, in a step S32, a decision is made to see if re-execution of the diagnostic program 12 is necessary. When the diagnostic program 12 has completed its execution or when a plurality of diagnostic programs 12 have been started sat the same time, the routine proceeds to a process step S33.

The diagnostic program 12 is re-executed. In other words, if the diagnostic program has finished its execution, the diagnostic program 12 is started again, or if a plurality of diagnostic programs have been started at the same time, all the diagnostic programs 12 are terminated once and the diagnostic program 12 is started again.

In a process step S34, the monitoring program performs a self-check to see if any problem has arisen in itself. If no problem is detected, the routine proceeds to the step S30 and the monitoring program continues monitoring. If any problem is detected, the monitoring program is terminated.

There is advantage described below in executing the monitoring program. Even if the earlier-mentioned embodiment is used just as it is, the re-execution of the diagnostic program only can be realized by a means as follows. In the case of UNIX, for example, when a diagnostic program 12 is registered in the file called /etc/inittab, if the respawn attribute is specified, OS10 monitors the diagnostic program 12, and if the diagnostic program 12 has been stopped, the OS10 re-starts the diagnostic program 12. In this case, the program which is started from /etc/inittab is limited to one.

Among the existing systems, there is a system that the diagnostic program can be executed in a plurality of modes on the same OS only by changing the setting. For example, there is also a system that the switch between 32-bit mode and 64-bit mode can be done only by file setting. However, the problem here is that since different dedicated programs are often required for the 32-bit mode and the 64-bit mode, if a single diagnostic program 12 is used, the diagnostic program becomes a huge size. If there is another reason that switching should be made between the modes other than the 32-bit mode and the 64-bit mode, the diagnostic program becomes a much larger size.

In such a case, if the diagnostic programs 12, which are started by deciding a mode at the start of operation, can be switched according to the environments, diagnosis can be performed with higher efficiency. According to this embodiment, since a diagnostic program 12 can be selected at the start of operation, the individual file sizes of the diagnostic programs 12 can be reduced and the main storage capacity consumed during execution can be decreased. Therefore, the instruction cache capacity consumed on the processor can be reduced, and the effect on the system can be further reduced.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method for performing diagnosis of an information processing system including one or a plurality of processors by using a diagnostic program, comprising:
    setting a time interval between executions of the diagnostic program and a length of time of execution of one diagnostic;
    reading out a diagnostic contents specification information stored in a memory which holds a diagnostic items table;
    selecting one or more diagnostic items from said diagnostic items table which terminate within said length of time of execution of one diagnostic;
    generating processes or threads for diagnosing the information processing system at said time interval; and
    executing one or more diagnostic items on each of said processors by using said processes or threads generated.

2. A method for performing diagnosis of one or a plurality of processors constituting an information processing system by a diagnostic program, comprising:
    setting a time interval between executions of the diagnostic program and a length of time of execution of one diagnostic;
    reading out a diagnostic contents specification information stored in a memory which holds a diagnostic items table;
    selecting one or more diagnostic items from said diagnostic items table which terminate within said length of time of execution of one diagnostic;
    generating processes or threads for diagnosing each of the processors at said time interval; and
    executing one or more diagnostic items on each of said processors by using said processes or threads generated.

3. The method for processing diagnosis according to claim 2, comprising:
    on detecting occurrence of a fault on said one of the processors, a related process or thread storing fault information in memory means, and terminating its operation; and
    another process or thread not having detected occurrence of the fault in said processor referring to said fault information on the other processors and, if any fault is detected, performing a specified fault process.

4. The method for performing diagnosis according to claim 3, wherein the performing said fault process includes cutting off said faulty processor from the system.

5. The method for performing diagnosis according to claim 2, comprising obtaining the number of said processors, wherein said generating generates said processes or threads according to said number of the processors.

6. The method for performing diagnosis according to claim 2, comprising specifying the contents of diagnosis according to the amount of said diagnosis executed, wherein said executing executes said specified contents of diagnosis.

7. The method for performing diagnosis according to claim 2, wherein said contents of diagnosis are an aggregate of a plurality of independently executable diagnostic items, and wherein said specifying selects and specifies at least one of the diagnostic items that can be executed within said amount.

8. The method for performing diagnosis according to claim 2, wherein in said generating, said diagnostic program is started by a monitoring program, the method comprising monitoring a running state of said diagnostic program started by said monitoring program, and stopping the diagnostic program in response to an error found in the diagnostic program.

9. An information processing system comprising:

a plurality of processors; and storage for holding OS, a diagnostic program, execution frequency specification information, diagnostic contents specification information, and diagnosed state information, wherein said OS starts said diagnostic program on an arbitrary processor, wherein said diagnostic program:

setting a time interval between executions of the diagnostic program and a length of time of execution of one diagnostic;

reading out the diagnostic contents specification information which holds a diagnostic items table;

selecting one or more diagnostic items from said diagnostic items table which terminate within said length of time of execution of one diagnostic;

generating processes or threads for diagnosing each of the processors at said time interval; and executing one or more diagnostic items on each of said processors by using said processes or threads generated.

10. A computer-readable medium holding a diagnostic program for diagnosing one or a plurality of processors constituting an information processing system, the program, when implemented, causing operations comprising:

setting a time interval between executions of the diagnostic program and a length of time of execution of one diagnostic;

reading out diagnostic contents specification information which holds a diagnostic items table;

selecting one or more diagnostic items from said diagnostic items table which terminate within said length of time of execution of one diagnostic;

generating processes or threads for diagnosing each of the processors at said time interval; and executing one or more diagnostic items on each of said processors by using said processes or threads generated.

* * * * *